Patented Dec. 22, 1953

2,663,621

UNITED STATES PATENT OFFICE 2,663,621

STABILIZATION OF PERACIDS

Frank P. Greenspan, Buffalo, and Donald G. MacKellar, Kenmore, N. Y., assignors to Buffalo Electro-Chemical Company, Inc., Tonawanda, N. Y.

No Drawing. Application February 7, 1952,
Serial No. 270,516

4 Claims. (Cl. 23—166)

This invention relates to the stabilization of aqueous solutions of inorganic peracids. It is particularly concerned with the stabilization of aqueous solutions of peroxymonosulfuric acid by the employment of dipicolinic acid as a stabilizer.

Peroxymonosulfuric acid, also known as Caro's acid, is an important and useful oxidizing agent. Although known for a long time, peroxymonosulfuric acid has hardly found any technical use, mainly because of the limited stability of the acid as made heretofore.

Peroxymonosulfuric acid may be made by various methods, such as by treating a peroxydisulfate (such as the so-called potassium persulfate) with concentrated sulfuric acid, by electrolysis of a fairly concentrated solution of sulfuric acid, or by direct action of concentrated hydrogen peroxide on concentrated sulfuric acid. This latter method has not received much attention in the past, but today the commercial availability of hydrogen peroxide in concentrations as high as about 90%, concentrations not available in the past, makes this method particularly well suited for the preparation of peroxymonosulfuric acid. We, therefore, prefer to make concentrated aqueous peroxymonosulfuric acid by the reaction between 90% hydrogen peroxide and concentrated sulfuric acid, but other modes of preparation may be used.

Peroxymonosulfuric acid, as prepared by our preferred method, may contain about 40% of the inorganic peracid. In a typical case, the solution obtained when following our preferred method of preparation, contained 43% peroxymonosulfuric acid, 3% hydrogen peroxide, 3% water and 51% sulfuric acid. As with peracids generally, increasing the resistance to decomposition, i. e., stabilization of the peroxymonosulfuric acid, has been found desirable. Improved stability of the peracid solutions is not only important in connection with handling, shipping and storing the more concentrated solutions of manufacture, but also in connection with the actual use of the more diluted solutions applied in various reactions.

It is a principal object of the present invention to provide an effective stabilizer for peroxymonosulfuric acid of substantially any strength, but particularly for peroxymonosulfuric acid solutions containing substantial amounts of the peracid, whereby the same may be handled, shipped and stored in concentrations greater than about 10% prior to dilution and subsequent use, although the invention is applicable to the stabilization of peroxymonosulfuric acid of any strength.

It is a particular object of the present invention to stabilize peroxymonosulfuric acid by incorporating small amounts of dipicolinic acid therein.

Peracids differ in many important aspects from peroxides, and the mechanism of decomposition of the two classes of compounds also shows pronounced differences. In the special case of peroxymonosulfuric acid, decomposition may be thought of as taking place in accordance with the following general equations:

$$H_2SO_5 + H_2O \rightleftharpoons H_2SO_4 + H_2O_2$$

and $$H_2O_2 \rightarrow H_2O + \tfrac{1}{2}O_2$$

or $$H_2SO_5 \rightarrow H_2SO_4 + \tfrac{1}{2}O_2$$

These equations explain why stabilizers heretofore employed and recognized as stabilizers for hydrogen peroxide are not effective as stabilizers for peroxymonosulfuric acid.

EXAMPLE I

Sodium stannate is an excellent stabilizer for hydrogen peroxide; it is not, however, effective for stabilizing peroxymonosulfuric acid, as shown by the following:

| Stabilizer | Concentration, Parts Per Million | Percent Peracid Loss Per Month at 30° C. |
|---|---|---|
| Sodium Stannate | 150 | 29 |
| None | None | 24 |

EXAMPLE II

A sample of relatively concentrated peroxymonosulfuric acid was prepared by reacting 1 mol of hydrogen peroxide in form of its 90% aqueous solution with 1.5 mol sulfuric acid in form of its 98% solution. The aqueous solution of peroxymonosulfuric acid resulting within a few minutes time from this reaction was analyzed and found to contain:

| | Percent |
|---|---|
| Peroxymonosulfuric acid | 43 |
| Hydrogen peroxide | 3 |
| Water | 3 |
| Sulfuric acid | 51 |

A portion of this 43% peroxymonosulfuric acid was divided into five parts. One of these served as control or blank, the others were dosed with varying amounts of dipicolinic acid. All were then stored in glass stoppered Pyrex glass bottles at 30° C. for one month, whereupon the percentage loss of peracid was determined with the following results as shown in the table.

*Table*

| Sample | Dipicolinic Acid, Parts Per Million | Percent Peracid Loss Per Month at 30° C. |
|---|---|---|
| 43% Peroxymonosulfuric acid | None | 24 |
| Do | 10 | 12.1 |
| Do | 100 | 10.0 |
| Do | 500 | 10.2 |
| Do | 1,000 | 8.0 |

The amount of stabilizer to be employed may vary considerably and may be from about 5 parts per million to about 1000 parts per million, depending upon the stability desired in the product, with the average quantity required to stabilize being in the neighborhood of 250 to 750 parts per million of dipicolinic acid.

The dipicolinic acid may be added to the materal subsequent to its formation or may be added to the ingredients prior to their reaction. No material difference in effectiveness of stabilization appears to result from the employment of these modifications of manufacture.

The following test shows that the dipicolinic acid is effective as a stabilizer in substantially any dilution of the peracid.

EXAMPLE III

A further portion of the same 43% solution of peroxymonosulfuric acid, as described in Example II, was diluted with water to yield a 20% solution of the peracid. This 20% solution of the peracid was divided into two parts; one part serving as a blank; to the other part was added an amount of dipicolinic acid corresponding to 1000 parts per million parts of the peracid. The samples were then stored in glass stoppered Pyrex glass bottles at 30° C. for one month, whereupon the percentage loss of peracid was determined with the following results:

| Sample | Dipicolinic Acid, Parts per Million | Percent Peracid Loss Per Month at 30° C. |
|---|---|---|
| 20% Peroxymonosulfuric acid | None | 17.0 |
| Do | 1,000 | 9.0 |

In general, the greater the amount of dipicolinic acid, the greater the stabilizing effect. The amount of dipicolinic acid required to impart a commercially acceptable degree of stability to the peracid will further depend on the initial instability of the peracid and the degree of stability desired in the final product. However, an addition of about 250 to 750 parts per million of dipicolinic acid will usually suffice in the average case.

Dipicolinic acid is generally recommended as a stabilizer in the form of the pure acid; however, the soluble salts, such as the alkali metal salts, may be employed to this end, as can certain double salts, such as the double salt with potassium nitrate. It is believed that in solution in the peracid dipicolinic acid itself is produced and functons as the stabilizer and, hence, is preferred.

By means of the present invention it is possible to obtain stabilities for peroxymonosulfuric acid which are not obtainable with any known peroxygen stabilizer. It is further possible to employ standard grade chemicals in the preparation of the peracid and by addition of dipicolinic acid thereto form a peracid of commercially acceptable, highly improved stability.

From the practical viewpoint, the invention will find wide applicability for the stabilization of commercial solutions of peroxymonosulfuric acid from about 10% to about 43% strength. It will be understood, however, that the invention is suitable for stabilizing peroxymonosulfuric acid of any strength.

The production of a stabilizer peroxymonosulfuric acid makes more feasible those chemical reactions where Caro's acid finds specific application, namely, the oxidation of primary amines to nitroso and to nitro compounds and as an oxidizing agent for organic compounds of olefinic nature.

What is claimed is:

1. The method of stabilizing peroxymonosulfuric acid which comprises incorporating at least 5 parts per million dipicolinic acid therein.

2. A stabilized peroxymonosulfuric acid aqueous solution containing at least 5 parts per million of dipicolinic acid as a stabilizer.

3. A stabilized peroxymonosulfuric acid aqueous solution containing from 250 to 750 parts per million of dipicolinic acid as a stabilizer.

4. A stabilized peroxymonosulfuric acid aqueous solution containing from 10% to 43% peroxymonosulfuric acid and at least 5 parts per million of dipicolinic acid.

FRANK P. GREENSPAN.
DONALD G. MacKELLAR.

References Cited in the file of this patent

UNITED STATES PATENTS

| Number | Name | Date |
|---|---|---|
| 2,363,778 | Pedersen | Nov. 28, 1944 |

OTHER REFERENCES

Yost and Russell "Systematic Inorganic Chemistry", page 372, 1944 Prentice-Hall, Inc., New York, N. Y.